Jan. 11, 1949.  K. L. SMITH ET AL  2,459,050
RUNNING GEAR ASSEMBLY FOR TRAILER WAGONS
Filed Aug. 16, 1946
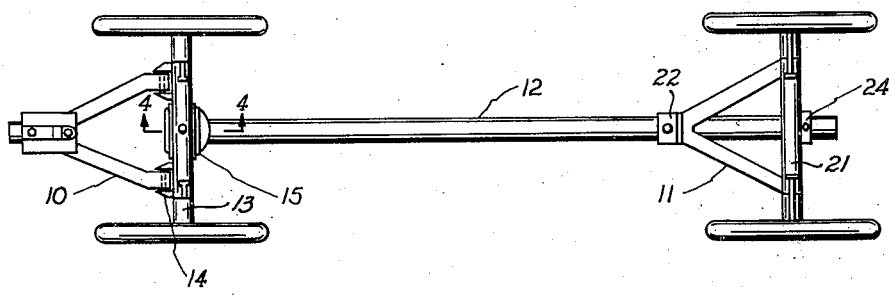
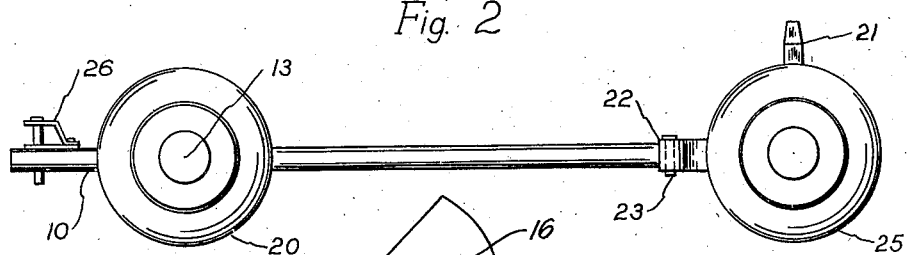
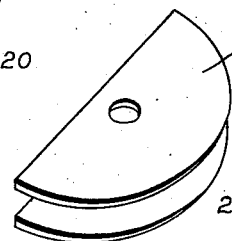
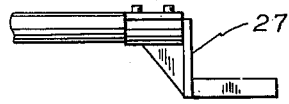
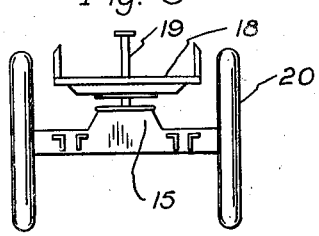
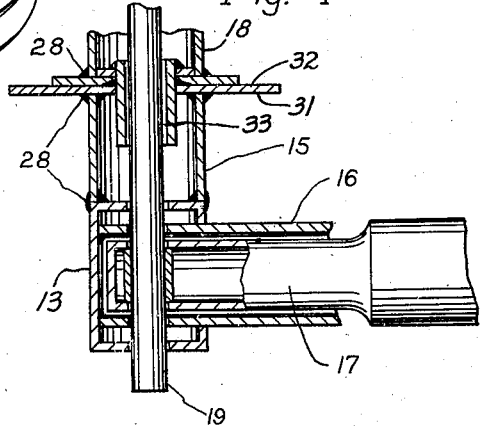
INVENTOR.
KENNETH L. SMITH AND
ELMO D. SMITH
BY *Victor J. Evans & Co.*
ATTORNEYS Patented Jan. 11, 1949

2,459,050

UNITED STATES PATENT OFFICE 2,459,050

RUNNING GEAR ASSEMBLY FOR TRAILER WAGONS

Kenneth L. Smith and Elmo D. Smith, Eufaula, Okla.

Application August 16, 1946, Serial No. 691,020

2 Claims. (Cl. 280—132)

The invention relates to a wagon, and more especially to a trailer wagon or the like.

The primary object of the invention is the provision of a wagon of this character, wherein the parts thereof in its entire assembly are welded together, thereby doing away with separate fasteners, which work loose and destroy the efficiency of the vehicle as a whole.

Another object of the invention is the provision of a wagon of this character, wherein the construction thereof is novel, and the assembly of its parts is unique in details, thus assuring a sturdy construction with maximum wearing qualities, the wagon being adapted for tractor draft.

A further object of the invention is the provision of a wagon of this character, wherein the reach pole is coupled to the front bolster assembly by a king pin, thereby giving added stability to such assembly.

A still further object of the invention is the provision of a wagon of this character, which is simple in construction, thoroughly reliable and effective in use, strong, durable, permitting sharp turns, metal built throughout, devoid of bolts or rivets, susceptible of draft by tractor or horse power, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a plan view of the wagon constructed in accordance with the invention;

Figure 2 is a side view thereof;

Figure 3 is a fragmentary side view of a horse draft tongue adapted for the wagon;

Figure 4 is a fragmentary detail sectional view taken approximately on the line 4—4 of Figure 1 looking in the direction of the arrows;

Figure 5 is a front end view of the wagon.

Fig. 6 is a perspective view of the half circular horizontally arranged guide member.

Similar reference characters indicate corresponding parts throughout the several views in the drawing.

Referring to the drawing in detail, the wagon constituting the present invention, comprises a front draft tongue hound 10, a rear reach pole hound 11, and a reach pole 12, respectively, these hounds and pole being made from metal, and the latter is of tubiform. The front axle 13 to which the front hound 10 is connected by pivots 14 has a central hollow housing 15 forming a riser to this axle. In this riser created by the housing 15 is built a half circular horizontally arranged guide member 16, in which is received the fore reduced end 17 of the reach pole 12.

Above the front axle 13 and superimposed on the riser 15 is a front bolster 18, which is made from metal, and removably inserted centrally through this bolster is a coupling king bolt or pin 19, which engages the end 17 of the reach pole 12, the journal ends of the axle 13 being fitted with front wheels 20, while the rear hound 11 projecting forwardly from the rear axle beneath the rear bolster 21 has a sleeve 22 connecting with the reach pole 12, by a release pin 23, and this pole is also coupled to the axle at the rear of the wagon by a bolster sleeve 24, thus it can be seen from Figure 1 the wheels 25 on this rear axle can be spaced under adjustment of the pole from the front wheels 20.

The front draft hound 10 as shown in Figures 1 and 2 of the drawing is provided with a tractor hitch 26, while in Figure 3 there is shown horse draft tongue adaptor 27, which may be substituted for the hitch 26, thus the wagon can be tractor drawn or horse drawn optionally.

The parts of the assembly of the wagon in its entirety are electrically welded at the meeting areas of such parts, as generally denoted at 28, in Figure 4 of the drawing. The riser portion 15 has a top wear plate 31 which cooperates with a bottom wear plate 32 on the front bolster 18. The front bolster has a depending bearing sleeve 33 through which king pin 19 extends.

What is claimed is:

1. A wagon construction comprising a front axle having wheels thereon and of hollow formation with an opening in the rear face thereof, a front hound connected to the front axle and adapted to receive a tongue, a rear axle having a sleeve formation extending rearwardly thereof, a rear hound extending forwardly of the rear axle and having a sleeve formation, a reach pole extending through the sleeve formation of the rear axle and the rear hound, a half circular guide member extending through the opening of the front axle with its straight edge in alignment with the front portion of the axle and having an opening from the top to the bottom, said reach pole having its end extending into the guide member and having an opening adapted to be aligned with the opening of the guide member, a bolster mounted on the top of the front axle, a bolster mounted on the top of the rear axle, and a king pin extending downwardly from the bolster of the front axle through the front axle, the guide member and the opening in the forward end of the reach pole lying within the guide member.

2. A wagon construction as defined in claim 1 and said front axle having a riser portion, a top plate secured to the upper end of the riser portion, said front bolster having a bearing sleeve through which the king pin is extended and a plate adapted to cooperate with the top plate of the riser portion.

KENNETH L. SMITH.
ELMO D. SMITH.

REFERENCES CITED

The following references are of record in the file of this patent:

UNITED STATES PATENTS

| Number | Name | Date |
|---|---|---|
| 631,979 | Barry | Aug. 29, 1899 |
| 729,168 | Henderson | May 26, 1903 |
| 882,981 | Turner | Mar. 24, 1908 |